United States Patent [19]
Bahr et al.

[11] 3,853,273
[45] Dec. 10, 1974

[54] AXIAL SWIRLER CENTRAL INJECTION CARBURETOR

[75] Inventors: Donald W. Bahr; Jack R. Taylor; Paul E. Sabla, all of Cincinnati, Ohio

[73] Assignee: General Electric Company, Cincinnati, Ohio

[22] Filed: Oct. 1, 1973

[21] Appl. No.: 402,041

[52] U.S. Cl. ............... 239/402, 239/404, 239/406, 239/466, 60/39.37, 60/39.74 R
[51] Int. Cl. .......................... B05b 7/00, F02c 3/00
[58] Field of Search.... 239/399, 400, 402, 403–406, 239/427–427.3, 427.5, 428, 429–431, 434.5, 466, 467, 472, 474, 475, 501; 60/39.37, 39.74 R

[56] References Cited
UNITED STATES PATENTS

| | | | |
|---|---|---|---|
| 391,865 | 10/1888 | Schutte | 239/472 X |
| 2,531,538 | 11/1950 | Smith | 239/404 |
| 2,734,560 | 2/1956 | Harris et al. | 239/403 X |
| 3,074,697 | 1/1963 | Friedell | 239/428 X |
| 3,589,127 | 6/1971 | Kenworthy et al. | 60/39.37 |
| 3,638,865 | 2/1972 | McEneny et al. | 239/424 |
| 3,648,457 | 3/1972 | Bobo | 60/39.74 R |
| 3,703,259 | 11/1972 | Sturgess et al. | 60/39.74 R |

*Primary Examiner*—Robert S. Ward, Jr.
*Attorney, Agent, or Firm*—Derek P. Lawrence; Lee H. Sachs

[57] ABSTRACT

An improved gas turbine engine fuel carbureting device includes a low pressure fuel tube for delivering fuel to a region located downstream of a cascade of axial, primary swirl vanes. The tip of the fuel tube may be fluted so as to impart swirl to the fuel emanating from radial holes located therein. The primary swirl vanes act to energize the fuel and deposit it on the inner surface of a venturi shroud, which provides a throat section downstream of the fuel tube. A cascade of counterswirl vanes surround the venturi shroud and provide a region of high shear forces which act to finely atomize fuel swirling out of the venturi shroud.

9 Claims, 3 Drawing Figures

PATENTED DEC 10 1974 3,853,273
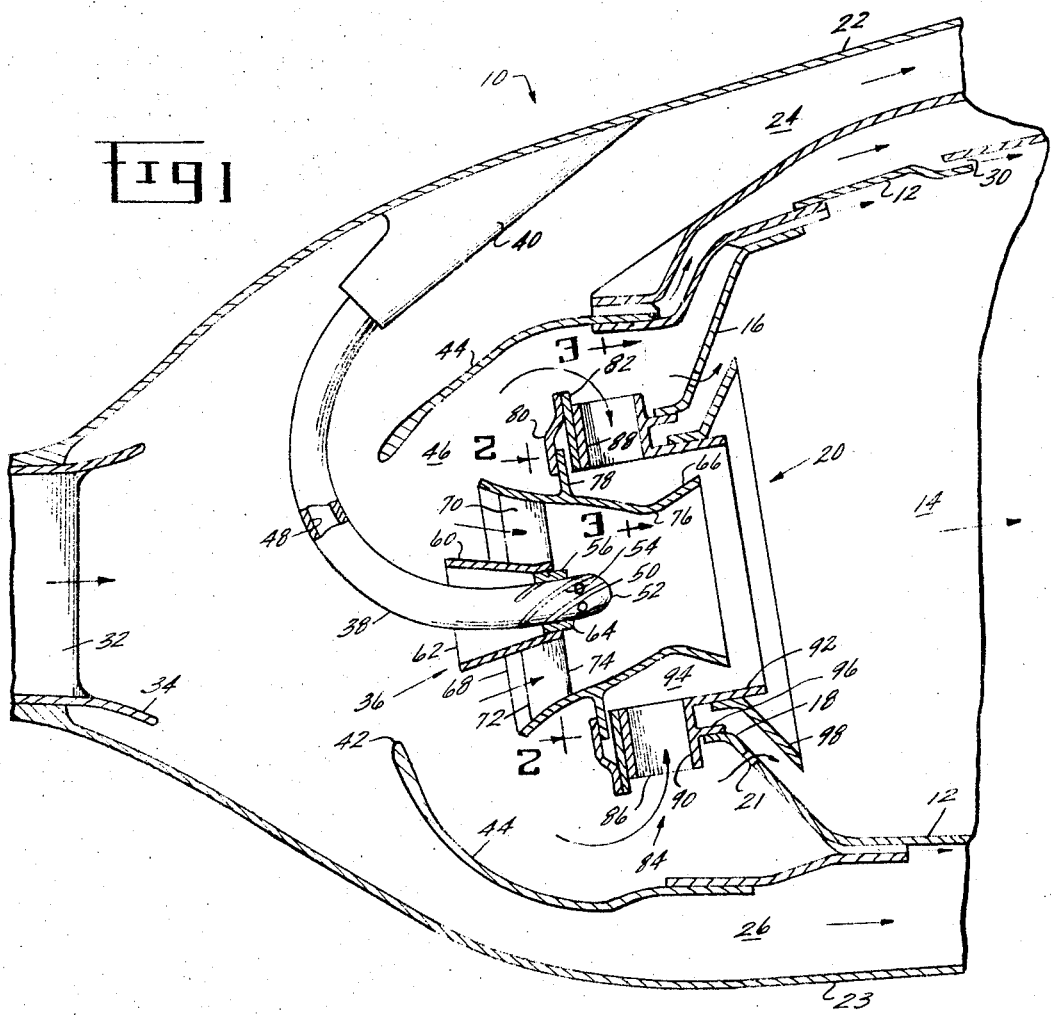
Fig 1
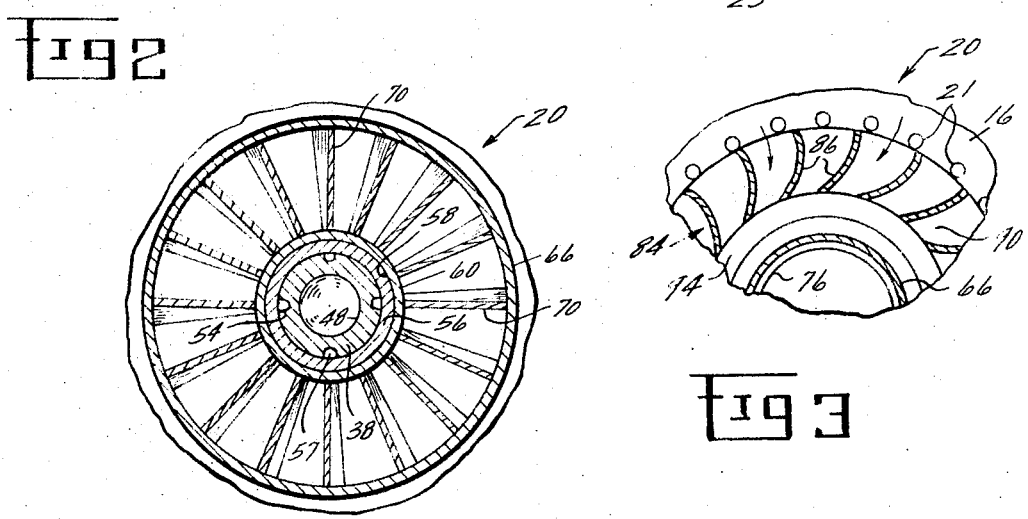
Fig 2
Fig 3

AXIAL SWIRLER CENTRAL INJECTION CARBURETOR

BACKGROUND OF THE INVENTION

This invention relates generally to gas turbine engine combustion systems and, more particularly, to improved apparatus for injecting and dispersing fuel into such combustion systems.

The invention herein described was made in the course of or under a contract, or a subcontract thereunder, with the United States Department of the Air Force.

Fuel injection into a continuous-flow combustion chamber as, for example, in a gas turbine engine has posed continuing design problems for engine manufacturers. Difficulties have been encountered in injecting fuel in a highly dispersed manner so as to achieve complete and efficient combustion of the fuel while minimizing the occurrence of fuel-rich pockets which, upon combustion, may produce carbon or smoke. Fuel injection difficulties have been further complicated by the recent introduction of gas turbine engines having increased combustor pressure and inlet temperature requirements. Existing fuel spray atomizer efficiency decreases as combustor pressure is increased, resulting in a more non-uniform dispersion of fuel, together with an increase in the fuel-rich zone within the combustion chamber. In addition to the potential carbon and smoke problems, such zones may cause a non-uniform heating of the combustor shell, a condition commonly referred to as hot-streaking, which can lead to deterioration of the shell.

Increasing the fuel pressure to conventional spray atomizers has been suggested as one possible solution to such problems. The increased weight of a high pressure pump, together with the increased propensity of leaking the volatile high pressure fuel, however, makes the use of such a high pressure pump undesirable.

More recently used carburetor systems have eliminated the conventional spray atomizers and replaced them with a system of counterrotational primary and secondary swirl vanes for use with a low pressure fuel delivery tube. Some systems have suggested that a fuel/air mixture be introduced upstream of the swirl vanes, whereupon the fuel becomes subsequently atomized upon shearing of the liquid fuel droplets from the swirl vanes. Such atomizers have been found on occasion to accumulate carbon between the swirl vanes when the inlet air flow and fuel delivered to the atomizers are at relatively high temperature levels.

More recent developments have centered on systems whereby a flow of fuel is introduced within a system of counterrotational primary and secondary swirl vanes and the fuel is efficiently atomized by the high shear forces developed at the confluence of the counterrotating air streams. The present inventive carburetion system makes use of the high shear forces developed by the counterrotating air streams and provides a system having less complexity and greater ease of manufacturing than most prior art systems.

SUMMARY OF THE INVENTION

It is an object of the present invention to provide a fuel injection and dispersal system for a gas turbine engine which provides good atomization and fuel/air mixing over a wide range of engine operating conditions with good ignition characteristics and minimum carbon formation possibilities.

It is a further object of this invention to provide a carbureting system which makes use of the high shear forces developed at the confluence of two counterrotating air streams and which is capable of use with a simple low pressure fuel injection tube.

It is also an object of this invention to provide a carbureting system which is readily manufactured and easily maintained.

Briefly stated, the above and similarly related objects are attained in the present instance by providing a carbureting system in which the fuel is introduced immediately downstream of a set of axial swirl vanes. Fuel is introduced directly from a centrally located fuel tube through several small holes near the end of the tube. The end of the tube is fluted and a small portion of compressor discharge air is delivered to the fluted passageways so as to impart a swirl to the fuel emitted through the holes located within the tube. Fuel droplets emerging from the fuel tube are centrifuged across an axial vortex formed by the set of axial swirl vanes to the inner surface of a venturi sleeve where a fuel film of uniform thickness is formed. The venturi section is placed inside of a set of radial inflow swirl vanes that swirl additional incoming air in the opposite direction to that of the axial swirler. This counterswirl flow provides a highly turbulent shear flow region just downstream of the exit plane of the venturi section that causes rapid atomization and mixing of the film of liquid fuel leaving the venturi surface.

BRIEF DESCRIPTION OF THE DRAWING

While the specification concludes with a set of claims which distinctly claim and particularly point out the subject matter of Applicants' invention, a complete understanding of the invention will be gained from the following detailed description of a preferred embodiment which is given in connection with the accompanying drawing, in which:

FIG. 1 shows a partial cross-sectional view of a typical combustion chamber of the type suitable for a gas turbine engine and including the fuel injection apparatus of the invention;

FIG. 2 is an enlarged, cross-sectional view, with portions deleted, taken generally along line 2—2 of FIG. 1; and FIG. 3 is a partial cross-sectional view taken generally along line 3—3 of FIG. 1.

DESCRIPTION OF A PREFERRED EMBODIMENT

Referring now to the drawing wherein like numerals correspond to like elements throughout, attention is directed initially to FIG. 1 wherein a continuous-burning combustion apparatus of the type suitable for use in a gas turbine engine has been shown generally at 10 as comprising a hollow liner 12 defining a combustion chamber 14 therein. The hollow liner 12 includes a transverse, upstream dome 16 formed integrally therewith and having a plurality of circumferentially spaced apart openings 18, each of which receives an improved fuel injection apparatus 20 of this invention. The upstream dome 16, together with the improved fuel injection apparatus 20, defines the upstream end of the combustion chamber 14. The transverse upstream dome 16 may also include a plurality of louvers or openings 21 through which a small amount of coolant flow passes, as is known in the art. As will be understood by those skilled in the art, the combustion chamber 14 may be of the annular type or the cannular type.

Outer shells 22 and 23 are provided around the hollow liner 12 and, in cooperation with the hollow liner, define outer and inner passageways 24 and 26, respectively. As will be understood by those skilled in the gas turbine art, the passageways 24 and 26 are adapted to deliver a flow of pressurized air from a suitable source, such as a compressor (not shown) into the combustion chamber 14 through suitable apertures or louvers 30. The pressurized air is delivered from the compressor through a plurality of circumferentially spaced apart outlet guide vanes 32 to a step diffuser 34, whereupon the air is divided between the outer and inner passageways 24 and 26 with a third portion of the airflow entering each of the plurality of fuel injection apparatus 20. The pressurized air delivered to the passageways 24 and 26 both cools the hollow liner 12 and, in flowing through the apertures 30, dilutes the gaseous products of combustion as is well known in the art.

Referring now to FIG. 2 in conjunction with FIG. 1, the improved fuel injection apparatus 20 of this invention is shown to include a fuel injector 36 comprised of a hollow fuel tube 38 which is connected to the outer shell 22 by means of a mounting bracket 40. The fuel tube 38 is curved so as to fit within an opening 42 formed by a pair of snout members 44 which are positioned upstream of the transverse dome member 16 and cooperates therewith to form an annular chamber 46.

As best shown in FIG. 1, the fuel tube 38 consists of a piece of hollow tubing having a fuel passageway 48 extending throughout the length thereof. The passageway 48 lies in fluid flow communication with a plurality of fuel injection holes 50 which extend radially outward from the passageway 48 near a curved inner end 52 of the fuel tube 38.

The fuel tubes 38 should not be confused with conventional atomizing nozzles in which fuel is delivered to a combustion chamber as a highly atomized spray. Such conventional atomizing nozzles normally include small passageways of decreasing area by means of which fuel is accelerated, pressurized and thereafter atomized as it expands from the nozzle outlet or throat. In other applications, such atomizing nozzles may include converging/diverging flow paths which are used to accelerate and pressurize the fuel which again is atomized by a process of expansion from the outlet of such a flow path. In contrast with this type of atomizing nozzle, Applicants' device includes the use of the low pressure fuel delivery tube 38 which consists simply of a hollow tube having a plurality of holes which extend through its external surface and connect to an internal flow passage. The holes would normally be of constant area and, while they might in certain cases provide some flow resistance if the total area of the holes is made smaller than that of the passageway 48, the holes 50 are not intended to act as atomizing nozzles and do not deliver an atomized spray of fuel to the combustor 10.

As further shown in FIG. 2, the inner end 52 of the fuel tube 38 is fluted, i.e. contains a number of small grooves 54 in the external surface thereof. Each of the grooves 54 lies between a pair of the fuel injection holes 50 such that fuel is delivered from the passageway 48 to the region between each of the grooves 54 near the end 52 of the fuel tube 38. Each of the grooves 54 extends in a spiral manner along a sufficient length of the fuel tube 38 so as to entrain a small portion of the air flow delivered to the chamber 46 and impart a slight swirl thereto for reasons which will become apparent.

Referring to both FIGS. 1 and 2, each of the fuel tubes 38 is provided with a wear collar 56 which is attached to the fuel tube 38 in the region of the groove 54 in any suitable manner, such as by brazing. As best shown in FIG. 2, the wear collar 56 and the grooves 54 thus cooperate to form a series of small airflow passages 57 around the perimeter of the fuel tube 38.

As shown in FIG. 2, the wear sleeve 56 is sized so as to come into sliding engagement with an opening 58 formed within a fuel tube support cup 60. The fuel tube support cup 60 forms a portion of the improved fuel delivery apparatus 20 and consists of a truncated, openended conical tube having an inlet 62 formed at the upstream end thereof and an outlet 64 at the downstream end thereof. The outlet 64 is sized so as to engage the outer surface of the wear sleeve 56 when the fuel tube 38 is positioned within the support cup 60. In this manner, all air delivered to the inlet 62 of the support cup 60 must flow through one of the passages 57 formed between the fuel tube 38 and the wear sleeve 56.

Each of the improved fuel delivery apparatus 20 also includes a venturi shroud 66 which surrounds the support cup 60 and defines an annular inlet 68 therebetween. The venturi shroud 66 supports the support cup 60 by means of a plurality of axial swirl vanes 70 which extend across the annular inlet 68. The axial swirl vanes 70 are provided with leading edges 72 which are located a short distance downstream of the inlet 68 and with trailing edges 74 which are located in the plane of the outlet 64 of the support cup 60. Furthermore, the trailing edges 74 of the axial swirl vanes 70 are located upstream of the fuel injection holes 50 as shown in FIG. 1. The venturi shroud 66 forms a convergent/divergent flow path with a throat 76 being located downstream of the end 52 of the fuel tube 38.

The axial vanes permit varying the degree of swirl obtained, as opposed to the use of radial vanes wherein the amount of flow passing through the vanes establishes the degree of turning. With the axial vanes, the degree of turning in the vanes themselves establishes the amount of swirl.

In addition, the axial swirl vanes provide a velocity gradient with the highest velocity being located near the centerline of the fuel injection apparatus 20, i.e. nearest the point where the fuel is being injected. This phenomenon aids in positively assuring that the fuel will be directed toward the venturi shroud 66.

The venturi shroud 66 is supported by means of a flange 78 which extends outwardly therefrom about the mid portion of the axial length of the venturi shroud 66. The flange 78 is attached in any suitable manner to a circular plate 80 which, in turn, is attached to a second circular plate 82. The second circular plate 82 is, in turn, connected to counterrotating air swirl means 84 which in the present instance take the form of a plurality of counterswirl, radial flow vanes 86, a plurality of which are located between a pair of radially extending walls 88 and 90, respectively. While radial vanes 86 are shown, in certain applications axial counterswirl vanes would be preferred and could easily replace the vanes 86.

The wall 90 extends from a conical tube 92 which surrounds the outlet of the venturi shroud 66 and cooperates therewith to form an annular flow path 94. The conical tube 92, and thus the fuel injecting apparatus 20, is mounted to the combustor by means of a flange 96 which extends from the wall 90, surrounds the conical tube 92, and fits within the opening 18. The flange 96 is connected to the transverse dome member 16 at the opening 18 in any suitable manner. Finally, the cylindrical tube 92 is surrounded by a flared trumpet outlet 98 which extends into the combustion chamber 14 as shown in FIG. 2.

As previously mentioned, a number of recently developed fuel injection systems have made use of a system of counterrotational primary and secondary swirl vanes to atomize the fuel droplets. The present system is similar to these developments in that it also makes use of the counterrotational primary and secondary swirl vanes and the high shear forces developed at the confluence of the counterrotating airstreams to atomize the fuel droplets. Various schemes have been developed in order to deliver the fuel to the area of high shear forces, all of which have some deficiencies in certain phases of operation of the gas turbine engine. For example, systems in which fuel is delivered upstream of the primary swirl vanes can result in carbon formation on such vanes at high inlet air and fuel temperatures.

Systems in which fuel is delivered by means of small boattail nozzles having swirl vanes surrounding the exit of such nozzles have proven successful in overcoming the carbon formation problems but are more complex than desirable from a manufacturing capability standpoint and are also susceptible to relight performance difficulties at certain operating environments. The present inventive fuel injection system is intended to overcome these problems and to provide a simplified fuel injection system which is capable of energizing the fuel over a wide range of operating environs. The manner in which the present inventive system energizes the fuel will be discussed in greater detail in connection with the operation of the fuel injection apparatus 20.

In operation, liquid fuel, which need not be highly pressurized and in actual practice may range from pressures as low as 1 psi up to 50 psi or more for a single engine design, above engine operating pressure, is delivered to the fuel injector 36 from a suitable source of fuel (not shown). The fuel flows through the passageway 48 and exits through the radial fuel injection holes 50. At very low fuel pressure differentials, such as 1 – 10 psi, the fuel would merely drip from the holes 50 and form a puddle unless some means of energizing the fuel is provided. Therefore, a small portion of the compressor discharge air flowing through the step diffuser 34 is permitted to enter the inlet 62 of the support cup 60 and to flow through the grooves 54 and the passages 57. The air flowing through the grooves 54 is given a tangential velocity because of the swirled grooves 54 and thus imparts a slight vortical flow to the fuel emanating from the fuel injection holes 50. Fuel flowing from these fuel injection holes 50 is swirled in a counterclockwise direction by the air flow through the groove 54 as referenced from a point upstream of the fuel injector 36.

The fuel emanating from the fuel injection holes 50 is further energized by means of a larger amount of compressor discharge air which flows through the inlet 68 and is acted upon by the axial swirl vanes 70. The swirl vanes 70 also serve to impart a counterclockwise swirl (again viewed from a reference point upstream of the fuel injector 36) to that portion of the air flowing through the inlet 68. This vortical flow entrains the vortical fuel efflux and centrifuges the fuel to the inner surface of the venturi shroud 66. The velocity of the swirling fuel leaving the fuel injection holes, upon reaching the venturi shroud 66, is accelerated by the venturi action of the shroud 66, and thus the fuel droplets are urged outwardly in a vortical flow which films the interior surface of the shroud 66. Fuel emanating from the fuel injection holes 50 is thus positively forced to flow to the inner surface of the venturi shroud 66. This contrasts with prior art systems in which fuel emanates from devices such as the boattail nozzles as a cylindrical flow having little or no vortical component (even though swirl vanes are positioned upstream of the nozzle) and with prior art systems in which radial inward swirl vanes are utilized to energize the fuel. In the present instance, the vortical grooves 54 and the axial swirl vanes 70, which provide the desirable velocity gradient previously mentioned, both positively direct the fuel emanating from the holes 50 outwardly toward the inner surface of the venturi shroud 66 thereby assuring that the entire circumference of the inner surface of the shroud 66 will be wetted by the fuel over a wide range of operating environment, i.e. a wide range of fuel pressures. This system is especially effective at high altitude relight conditions wherein low fuel pressure conditions exist and the density of air is insufficient to otherwise assure positive energization of fuel emanating from the fuel injector 36.

the fuel which thus wets the inner surface of the venturi shroud 66 flows from the downstream end thereof as a swirling film of liquid fuel. A portion of the air which enters the chamber 46 then flows through the counterswirl vanes 86 and thereafter flows through the passageway 94 with a swirl velocity in a direction opposite that of the fuel sheet which flows from the downstream end of the venturi shroud 66. This counterswirl air then acts upon the swirling film of liquid fuel to highly atomize the fuel due to the high aerodynamic shear stresses developed at the confluence of the counterrotating vortical air flows.

While not meant to be restrictive in any manner, examples of the sizes of the various flow passages will now be given in order to place the present invention in proper perspective. The inlet 62 of the support cup 60 and the passageways 57 are sized so as to flow from 0.5 to 2.5 percent of compressor discharge air, whereas the inlet 68 and the flow path between the axial swirl vanes 70 is sized so as to flow approximately 4 to 7 percent of compressor discharge air. From this, it becomes apparent that the desired ratio of air flow through the axial swirl vanes to that through the passageways 57 should fall between 2.5/1 and 5.0/1. In addition, the amount of air flow through the counterswirl vanes 86 falls in the range of 7 to 11 percent of compressor discharge air or, in other words, the ratio of counterswirl air to primary flow air should lie between 1.0/1 and 2.0/1.

As previously mentioned, certain changes could be made in the above described system without departing from the broad inventive concept. For example, the radial vanes 86 could be replaced with a set of axial counterswirl vanes. In certain applications, small radially extending tubes could be placed in the fuel injection holes 50 in order to inject the fuel directly into the path of primary swirl flow through the axial vanes 70. In other applications, the fluted passageways 54 may be deleted and the vanes 70 alone used to energize the fuel. The appended claims are intended to cover these and similar modifications which fall within the scope of the invention.

What is claimed is:

1. A fuel carbureting device for a gas turbine engine comprising:
   a support cup having an inlet and an outlet;
   a venturi shroud surrounding said support cup and cooperating therewith to define an annular flow path therebetween, said shroud having an upstream end, a downstream end, and a throat section located therebetween;
   a plurality of axial swirl vanes positioned between said support cup and said venturi shroud and adapted to swirl air flowing through said flow path in a first direction;
   a fuel tube having a first end adapted to receive fuel and a second end positioned within said support cup, a fuel passage extending from said first end to said second end, a plurality of fuel injection holes located near said second end adapted to deliver fuel to the swirled air flow from said axial vanes; and
   means for generating a counterswirl flow of air at the downstream end of said venturi shroud.

2. A fuel carbureting device as recited in claim 1 wherein said fuel tube includes a fluted exterior surface which provides a plurality of grooves in said exterior surface adapted to receive air flowing through said inlet of said support cup and fuel from said fuel injection holes, said grooves and said support cup cooperating to swirl fuel from said fuel injection holes in said first direction.

3. A fuel carbureting device as recited in claim 2 further including a wear collar surrounding said fuel tube in the vicinity of said grooves and cooperating with said grooves to provide a plurality of passageways between said collar and said exterior surface of said tube.

4. A fuel carbureting device as recited in claim 3 wherein said wear collar is sized so as to block said outlet of said support cup.

5. A fuel carbureting device as recited in claim 3 wherein said axial vanes have leading edges and trailing edges, and said wear collar terminates in a plane defined by the trailing edges of said vanes.

6. A fuel carbureting device as recited in claim 5 wherein said fuel injection holes lie between said wear collar and said throat section of said venturi shroud.

7. A fuel carbureting device as recited in claim 1 wherein said fuel injection holes lie between said axial vanes and said throat section of said venturi shroud.

8. A fuel carbureting device as recited in claim 7 wherein said fuel injection holes extend between said fuel passage and said exterior surface of said fuel tube and said holes have approximately equal flow areas along the entire length thereof.

9. A fuel carbureting device as recited in claim 8 wherein said counterswirl flow generating means comprise a cylinder surrounding said venturi shroud and defining a flow path therebetween and a plurality of vanes adapted to deliver air to said flow path as a vortical flow in a direction opposite that of said first direction.

* * * * *